United States Patent [19]
Schmidt et al.

[11] Patent Number: 5,293,570
[45] Date of Patent: Mar. 8, 1994

[54] TELECOMMUNICATION NETWORK

[75] Inventors: Lothar Schmidt, Fuerstenfeldbruk; Alfred Jugel, Geretsried, both of Fed. Rep. of Germany; Andy Mallinson, Poole, Great Britain; Peter Rau, Munich, Fed. Rep. of Germany

[73] Assignees: Siemens Aktiengesellschaft, Munich, Fed. Rep. of Germany; GPT Limited Coventry, London, United Kingdom

[21] Appl. No.: 932,314

[22] Filed: Aug. 19, 1992

[30] Foreign Application Priority Data

Aug. 19, 1991 [EP] European Pat. Off. ......... 91307636

[51] Int. Cl.⁵ .......................................... H04L 12/56
[52] U.S. Cl. ................................... 370/60.1; 370/94.1
[58] Field of Search ................. 370/53, 60, 60.1, 94.1, 370/94.2, 99

[56] References Cited

U.S. PATENT DOCUMENTS

| | | | |
|---|---|---|---|
| 4,926,416 | 5/1990 | Weik | 370/60.1 |
| 5,168,492 | 12/1992 | Beshai et al. | 370/60.1 |
| 5,204,857 | 4/1993 | Obara | 370/60.1 |

FOREIGN PATENT DOCUMENTS 0119105 9/1984 European Pat. Off. .
0225714 6/1987 European Pat. Off. .
0363499 4/1990 European Pat. Off. .

OTHER PUBLICATIONS

"Synchronous & Asynchronous Transfer modes in the Future Broadband ISDN, by Schaffer, IEEE International Conference on Communications", (1988), pp. 1552–1558.

"Composite Mini-Packet Switching", IBM Technical Disclosure Bulletin vol. 32, No. 5A, Oct. 1989, pp. 162–164.

*Primary Examiner*—Benedict V. Safourek
*Attorney, Agent, or Firm*—Hill, Steadman & Simpson

[57] ABSTRACT

The telecommunication network is composed to a greater degree of ATM exchanges (ATM) and to a lesser degree of STM exchanges (STM). Information coming from an STM exchange (for example, STM1) and to be communicated to a further STM exchange (for example, STMy) via an ATM exchange (for example, ATM1) is packeted in message cells of the same length as those message cells used for the transmission between ATM exchanges in order to reduce the packeting time for the through-connection across the ATM exchange (ATM1). However, respective message parts of a plurality of STM time channels (K1 through K4) that are to be through-connected to the same ATM exchange output are multiplexed in a message cell.

3 Claims, 2 Drawing Sheets

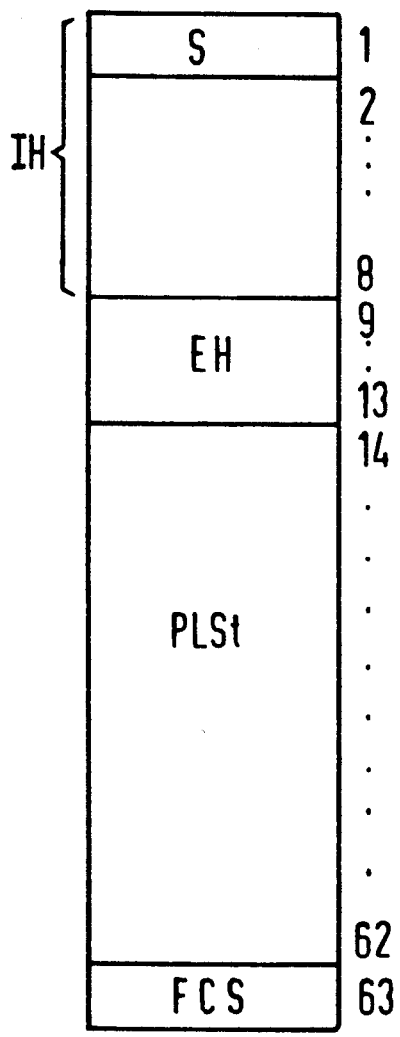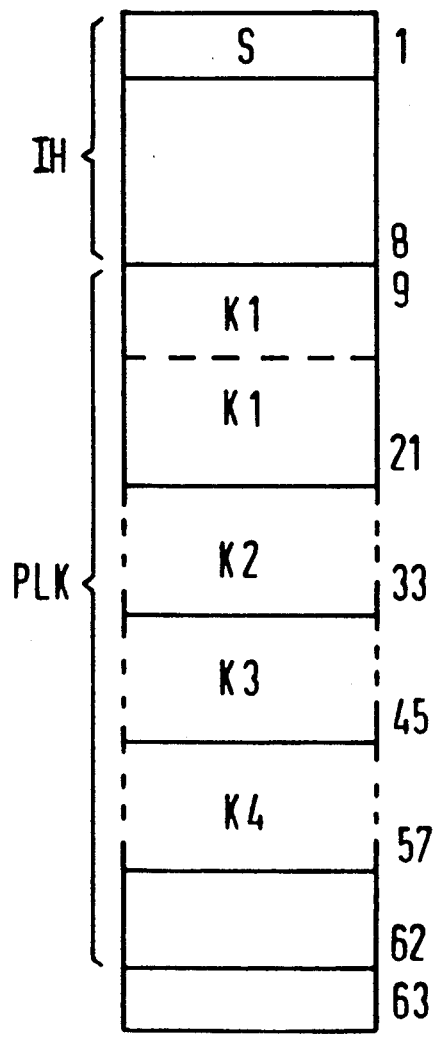

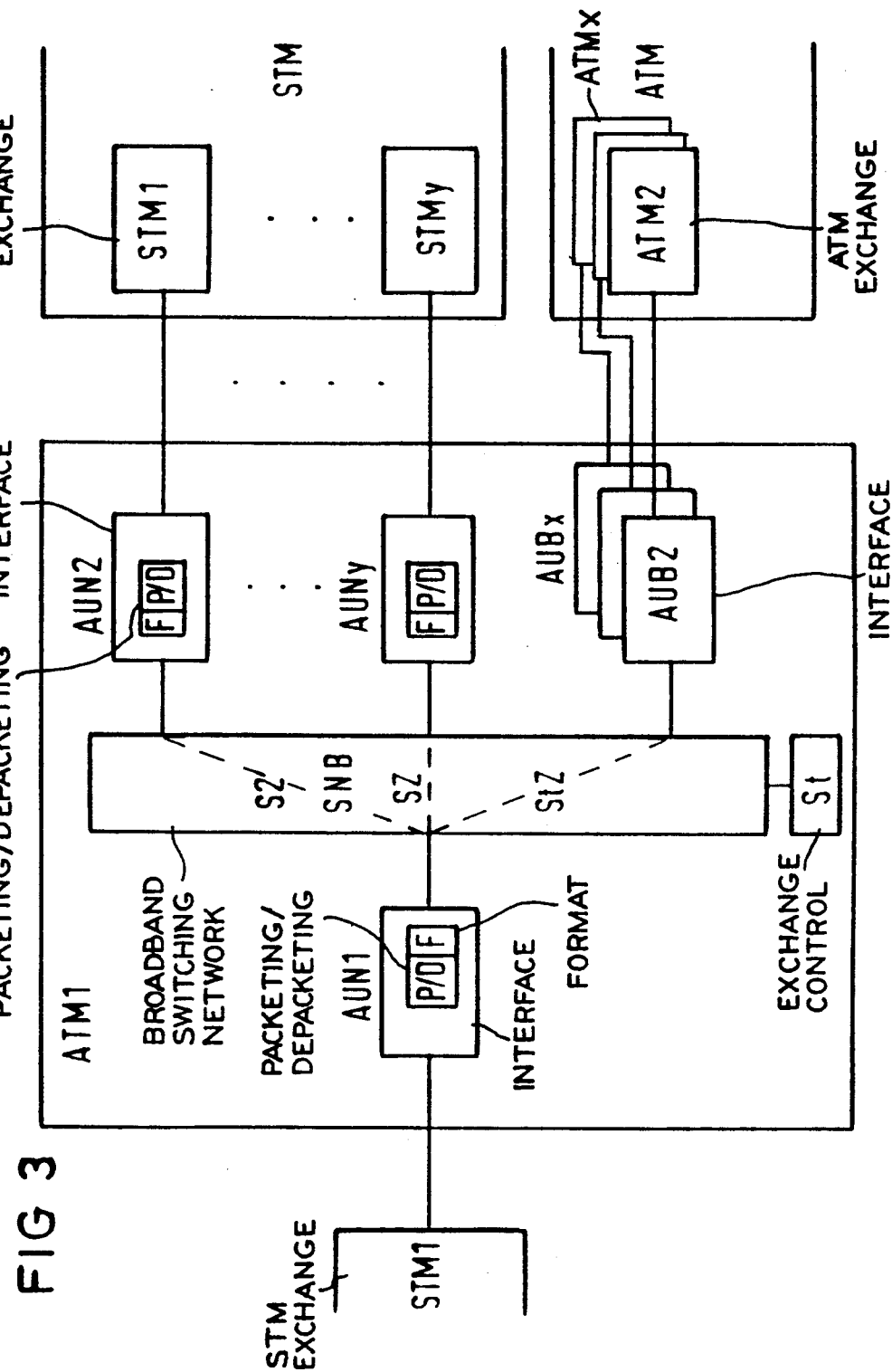

TELECOMMUNICATION NETWORK

BACKGROUND OF THE INVENTION

The present invention is directed to a telecommunication network having switching centers that to a greater degree operate on the basis of asynchronous through-connection of message packets in message cells of a fixed length via virtual connections (ATM exchanges) and to a lesser degree operate on the basis of synchronous circuit-switched through-connection (STM exchanges), comprising interfaces allocated to the ATM exchanges that serve the purpose of connecting transmission lines that are connected to STM exchanges and carrying circuit-switched messages.

Such a telecommunication network is to be understood as a transitional stage to future telecommunication networks wherein the asynchronous transfer mode (ATM) is employed throughout. By contrast to currently installed telecommunication networks, which operate in the synchronous transfer mode (STM), telecommunication networks operating in the ATM mode have a significant advantage. The available transmission capacity of a transmission channel can be flexibly utilized for a multitude of services such as voice, data, image transmission and can thereby be allocated to a single service or to a plurality of services dependent on time and need.

The introduction of a universal telecommunication network on an ATM basis can only be successful when the possibility of cooperation is economically possible of previously existing telecommunication networks operating on an STM basis and executing 64 Kb/s voice services with new switching centers operating on an ATM basis.

A hybrid solution for a telecommunication network has been proposed in this context which provides three functionally separate system components at the exchanges. First is what is referred to as a cross connector for the connection of transmission lines via which information is transmitted at higher bit rates, for example 2 Mb/s, in STM mode, this essentially assuming the function of an electronic main distributor. Second is a narrowband exchange that corresponds in practice to current narrowband exchanges for the connection of central office lines and transmission lines for information transmitted on an STM basis with a bit rate of 64 Kb/s. Finally, third is a broadband exchange that operates on an ATM basis, i.e. as a packet exchange having message cells of fixed length and for setting virtual connections. Each of the three system components of the exchanges of such a hybrid network have separate line units and a separate switching network. Of course, such a solution is extremely cost and maintenance intensive.

By contrast, in the initially described telecommunication network, universal network nodes operating on an ATM basis are provided. With on-going network expansion, the number of these should dominate more and more over network nodes operating on an STM basis and should ultimately be present as the only type of network node. These universal network nodes have only a single ATM switching network for all three types of connection or, respectively, employment of the hybrid telecommunication system.

In order to be able to process information that is incoming on an STM basis, these must be packeted in ATM message cells in interface units and must be in turn depacketed after passing through the switching network and be superimposed into addressed time slots, to which end the appertaining interfaces have packeting/depacketing means.

Since such a universal network node is provided with a uniform switching network, uniform interfaces and a central controller and also operates with uniform path-finding and uniform maintenance functions, lower capital costs and lower outlay for maintenance result as compared to the aforementioned hybrid solution. Moreover, expandability is established without particular outlay in the basic equipment.

As presented, the STM messages must be packeted in ATM message cells in order to also be able to process STM messages in such a universal ATM network node.

The format of such ATM message cells is already largely defined, whereby a useful information field that covers 48 time slices covering 8 bits each, what are referred to as octets, is provided per message cell in addition to a message header. At least one of these can be utilized for further particulars about, for example, the nature of the message cell.

For packeting the samples of a time channel respectively coded with 8 bits for transmission of 64 Kb/s voice information, the chronological duration of 47 sampling pulse frames is required in this case, so that a packeting time of $48 \times 125$ $\mu$s = 6 ms is required together with the one octet. With jitter compensation, the depacketing requires approximately 0.25 ms, so that a time delay of 6.25 ms arises overall in the transmission in one direction.

In current digital telephone networks, approximately 1.5 ms are allowed for local exchanges as transit times within the exchanges that mainly arise due to the analog-to-digital conversion or digital-to-analog conversion. Approximately 1.0 ms per transmission direction are allowed for tandem switching centers, so that an allowable overall transit time of at most 15 ms per transmission direction results for a network in which a connection runs by a maximum of 3 local exchanges and a maximum of 6 tandem switching centers given a maximum distance of approximately 1000 km.

The maximum delay time allowed in Great Britain is only 12.5 ms, whereas in the US, it is 17.5 ms per transmission direction. The demands made with respect to adhering to transit time limits serves the purpose of assuring the voice quality, since longer transit times lead to noticeable echo effects because of the reflections of the voice signals at the hybrid circuits in the subscriber terminal equipment of the listening subscriber.

The aforementioned delays of 6.25 ms arising in conjunction with the packeting/depacketing procedure are thus approximately 5 ms greater than the required transit time limit for exchanges.

In order to assure the required voice quality under these conditions, separate echo compensators must be utilized per transmission direction. However, over and above this, care would also have to be exercised to ensure that a plurality of network transitions whereat the aforementioned delay due to packeting/depacketing procedures respectively arises, are avoided in voice connections since a compensation of transit time on the order of the required magnitude for a plurality of network transitions can no longer be governed with echo compensators. This, however, would require an involved intermeshing between the STM exchanges of the STM network that still exists and the ATM exchanges that are intended to be the basis for the future universal network.

For the purpose of reducing the delay times in the packeting of STM voice information that is transmitted with a transmission rate of 64 Kb/s, it has therefore been proposed in conjunction with a telecommunication network of the type initially described to only partially occupy the message cells of fixed length in the ATM system with STM messages (European Patent Application 88 11 57 25.9). Such a procedure, of course, means a poor exploitation of the transmission capacity. In order to provide a certain amount of compensation, it has also been proposed in the patent application to respectively define the degree of occupation of the message cells during call set up in call-associated fashion in accord with the call set up information co-transmitted during the call set up and to keep this low for long-distance connections that proceed via a plurality of exchanges but to allow a higher degree of filling for connections in the local area.

It is precisely in long-distance connections, however, that a high bit rate is particularly desirable for economical reasons, since the proportion of the costs for the transmission technology outweighs those for the exchanges. Apart therefrom, of course, the measures for improving the exploitation of the transmission capacity also require a considerable outlay in terms of control.

SUMMARY OF THE INVENTION

It is an object of the present invention to provide a telecommunication network of the type initially described such that echo compensators and involved intermeshing structures required in the prior art for voice quality are largely avoided and a significant reduction in the degree of utilization of the existing transmission capacity is nonetheless acceptable for useful information, i.e. voice information in this case.

This object is inventively achieved in that the packeting/depacketing means, contained in the interfaces of the ATM exchanges for connections to be set up between an STM exchange via an ATM exchange and a further ATM exchange or terminal equipment (ATM terminal equipment) equipped for the reception of asynchronously through-connected message packets, packet the incoming circuit-switched messages into message cells having a first, fixed length like those that are also formed for connections between ATM exchanges or ATM terminal equipment. However, for connections between STM exchanges to be produced via an ATM exchange, these packeting/depacketing means respectively packet message parts of a plurality of incoming time channels that are to be through-connected to the sam switching network output of the ATM exchange allocated to an exchange destination direction without taking their position in the pulse frame structure of the STM transmission mode into consideration. They are packeted multiplexed in message cells that likewise have the same length.

The telecommunication network of the present invention thus operates with different occupations of the message cells of fixed length in conjunction with the through-connection of STM messages. When the connection leads from the appertaining ATM exchange to another ATM exchange, a plurality of successive samples of a single time channel are packeted in a message cell and the format of this message cell, i.e. the division into internal and external cell headers and information part, corresponds to the prescribed cell format for traffic between ATM exchanges. For the connection between two STM exchanges via an ATM exchange, for which the message cells are required only for the through-connection through the ATM exchange, i.e. for which there is a certain liberality with respect to the structure of the message cells, message parts of a plurality of time channels are packeted multiplexed. This means that, on the one hand, the information part of the message cells can be better utilized than in the aforementioned, proposed method, whereby the degree of packeting is variable in call-dependent fashion but wherein the packeting time can nonetheless be kept so short that the employment of echo compensators is superfluous. Since, on the other hand, the occupation with message parts from a plurality of time channels occurs without taking their position in the pulse frame structure of the STM transmission mode into consideration, the utilization of the message cells can be made relatively independent of the current occupation state.

In order to achieve a compromise between usage and delay time, message cells according to a further development of the present invention are already transmitted when a given degree of filling is reached and a given waiting time thereafter has elapsed.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 depicts the format of an internal standard message cell for through-connection by exchanges in ATM telecommunication networks;

FIG. 2 depicts the format of message cells inventively used within an ATM exchange for the through-connection of STM message to STM exchanges; and FIG. 3 is a block diagram of a part of a telecommunication network having STM exchanges and ATM exchanges.

DESCRIPTION OF THE PREFERRED EMBODIMENT

The standard message cell according to FIG. 1 has a total of 63 octets, i.e. time slices of respectively 8 bits each. Eight such octets are occupied by an internal cell header IH (internal header) that essentially contains a synchronization octet S, octets containing routing information for the path through the switching network, as well as one octet for a cell number for identifying the cell sequence. A further cell header, the external cell header EH (external header) covers 5 octets and contains particulars about a virtual channel and a virtual connecting path to which the appertaining message cell is allocated.

This is followed by an information part PLSt covering 48 octets wherein the actual telecommunication information is transmitted. Last is another octet FCS that indicates the cell end.

The aforementioned internal header IH is removed after traversing an exchange before continued transmission of the message cell, so that externally appearing cells are composed only of the external header EH and of the information part PLSt.

Only an internal header IH is present in the message cell shown in FIG. 2 as inventively employed for passage through ATM exchanges for connections between STM exchanges via an ATM exchange, since these message cells do not appear outside the ATM exchange. In the illustrated example, it covers 8 octets.

The information part PLK of such a message cell in the illustrated case is utilized for the packeted information parts of four time channels K1 through K4, whereby 12 octets are available for every time channel, 8 octets thereof being again utilized for the actual channel information. This means that a packeting time of 8 pulse frames, i.e. 8 times 125 µs = 1 ms results and, thus, a value that is still justifiable in view of echo problems.

The other four octets of the 12 octets utilized for a time channel contain, among other things, the channel address as well as, a possible sequence feature in order to guarantee the correct cell sequence per channel.

In the assumed division of the message cell according to FIG. 2 which has the same length as the standard message cells of the ATM system, 4 octets remain unused.

However, other divisions are possible within the framework of this prescribed length. For example, the channel information of 5 time channels can be multiplexed, in which case only 7 octets per time channel are then available for the channel information. In any case, the situation is such that information of time channels are multiplexed in a message cell, this information to be through-connected to the same switching network output of the ATM exchange. The sequence of the channel locations within a message cell, by contrast, is arbitrary in the present invention.

As a result of this latter liberality, the dependency of the degree of utilization of the multiplexed channels carrying message cells on the traffic distribution is reduced. The utilization of such message cells is lowest when, given n switching network outputs, respectively only one of the incoming time channels is to be switched to n−1 outputs, by contrast whereto all other incoming time channels are to be switched to the one remaining output. Only one time channel location in one of the inventively provided message cells, is then occupied. The other three additional channel locations remain free. A traffic distribution that is beneficial in view of the utilization of the message cells results when the incoming time channels are uniformly distributed onto all switching network outputs.

In order to achieve a compromise between message cell utilization and delay time in the cell occupation, it is a further development of the invention that the message cells in which message parts of a plurality of time channels are packeted multiplexed are forwarded after the expiration of a prescribed waiting time, even when their maximum degree of filling has not yet been achieved. In the above-explained example wherein a packeting time of 1 ms results, an additional waiting time of 0.5 ms is recommended, this, given a connection value of 64 transmission lines to be connected to STM exchanges that is realistic in practice, leading to a relatively high degree of filling of the message cells, so that relatively few, additional message cells are required in comparison to the case of a respectively full utilization of the message cells with channel information.

FIG. 3 shows the portion of a telecommunication switching network that covers exchanges operating both on an ATM basis as well as on an STM basis.

STM exchanges STM1 through STMYy are in communication via interfaces AUN1 through AUNy with an ATM exchange ATM1 that is shown in somewhat greater detail.

There is also a connection of the ATM exchange ATM1 to further ATM exchanges ATM2 through ATMx via interfaces AUB1 through AUBx.

An ATM broadband switching network SNB and an exchange control ST are shown as critical components parts of the ATM exchange ATM1.

Packeting/depacketing units P/D are situated in the interface units AUN1 through AUNy. Decoded time slot contents of the channel information coming from an STM exchange are ordered into an ATM message cell by means of these packeting/depacketing units P/D or are in turn depacketing at the output side and are ordered in time slots for continued transmission to an STM exchange. Formatting units F of these interface units handle a formatting of message cells as standard cells or as message cells containing inventively multiplexed data information.

Insofar as connections are involved that lead from an STM exchange, i.e., for example, from the STM exchange STM1, via the ATM exchange ATM1 to another ATM exchange, for example ATM2, cells having the standard format are formed in the interface AUN1, as shown in FIG. This thereby takes the situation into consideration that the standardized ATM transmission protocol must be observed between ATM exchanges, i.e. between the interface AUB1 and the ATM exchange ATM2 in this case.

Insofar as connections between two STM exchanges are involved, i.e., for example, connections between the exchange STM1 and STM2, that are to be conducted via the ATM exchange ATM1, message cells according to FIG. 2 are inventively formed in the interface AUN1. In the best occupation case, these message cells contain time slot contents of, for example, 4 time channels that are to be switched in the same exchange destination direction, i.e. are all to be through-connected to the switching network output of the broadband switching network SNB connected to the interface ANU2. In this interface ANU2 occurs depacketing and reordering of the time channel contents into time slots of the appertaining time channel whose address is likewise contained in the information part of the message cell. The message cell is thus used only within the ATM exchange, no infractions of established protocols thus result. As desired, on the other hand, inadmissibly high delay times arising during packeting are avoided. This is also further promoted in that the message cells are already forwarded from the interface AUN1 to the switching network after expiration of a prescribed waiting time before they reach their maximum degree of filling when an adequate plurality of channels that are to be switched to the exchange STM2 are not present during a time span under consideration. Given the resulting delay times in this context of 1 ms packeting time, 0.5 ms waiting time and 0.25 ms depacketing time, the overall resulting time delays in the course of an average connection are still short enough so that they cannot lead to the aforementioned, inadmissible echo effects.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A telecommunication network having a plurality of switching centers composed of ATM exchanges and STM exchanges, the ATM exchanges of the plurality of switching centers operating on the basis of asynchronous through-connection of message packets in message cells of a fixed length via virtual connections and the STM exchanges of the plurality of switching centers operating on the basis of synchronous, circuit-switched through-connection, the ATM exchanges having interfaces for connecting transmission lines that are connected to STM exchanges and that carry out circuit-switched messages, comprising: in the interfaces of the ATM exchanges, packeting/depacketing means for packeting received circuit-switched messages into message cells of the same length and same structure by time channels as message cells used for connections between ATM exchanges for connections to be set up between an STM exchange via an ATM exchange and an ATM exchange or ATM terminal equipment equipped for reception of asynchronously switched message packets, and, for a connection between STM exchanges to be set up via an ATM exchange, means for packeting received message parts of a plurality of incoming time channels that are to be through-connected to a common switching network output of the ATM exchange allocated to an exchange destination direction in multiplexed fashion irrespective of the sequence of the message parts in a pulse frame structure of the STM transmission mode into consideration, said message parts being packeted multiplexed in message cells that have the same length as said message cells used between ATM exchanges.

2. The telecommunication network according to claim 1, wherein the message cells, having message parts of a plurality of time channels that are packeted multiplexed, are already forwarded to a switching network of the ATM exchange before the message cells reach a maximum degree of filling when a prescribed waiting time has elapsed.

3. A telecommunication network having a plurality of switching centers composed of ATM exchanges and STM exchanges, the ATM exchanges of the plurality of switching centers operating on the basis of asynchronous through-connection of message packets in message cells of a fixed length via virtual connections and the STM exchanges of the plurality of switching centers operating on the basis of synchronous, circuit-switched through-connection, the ATM exchanges having interfaces for connecting transmission lines that are connected to STM exchanges and that carry circuit-switched messages, comprising: in the interfaces of the ATM exchanges, packeting/depacketing means for packeting received circuit-switched messages into message cells of the the same length and same structure by time channels as message cells used for connections between ATM exchanges for connections to be set up between an STM exchange via an ATM exchange and an ATM exchange or ATM terminal equipment equipped for reception of asynchronously switched message packets, and, for a connection between STM exchanges to be set up via an ATM exchange, means for packeting received message parts of a plurality of incoming time channels that are to be through-connected to a common switching network output of the ATM exchange allocated to an exchange destination direction in multiplexed fashion irrespective of the sequence of the message parts in a pulse frame structure of the STM transmission mode into consideration, said message parts being packeted multiplexed in message cells that have the same length as said message cells used between ATM exchanges, and means for forwarding the message cells that have packeted multiplexed message parts of a plurality of time channels to a switching network of the ATM exchange before the message cells reach a maximum degree of filling when a prescribed waiting time has elapsed.

* * * * *